United States Patent Office 2,731,497
Patented Jan. 17, 1956

2,731,497

PRODUCTION OF TETRACYCLINE

Jerry R. D. McCormick, Mahwah, and Neva-Tay Kathleen Smith, Park Ridge, N. J., assignors to American Cyanamid Company, New York, N. Y., a corporation of Maine No Drawing. Application May 14, 1954,
Serial No. 429,986

6 Claims. (Cl. 260—559)

This invention relates to a method for the production of tetracycline by the hydrogenolysis of chlortetracycline and is directed particularly to the provision of an improved class of catalysts for this reaction.

Tetracycline is a recently developed antibiotic which combines a high degree of activity with good stability in slightly alkaline aqueous solutions. It can be produced from chlortetracycline by a hydrogenolysis reaction wherein equimolecular quantities of hydrogen and chlortetracycline are reacted with the formation of tetracycline and hydrochloric acid or tetracycline hydrochloride. Using the presently accepted formulas for chlortetracycline and tetracycline this reaction is as follows:

*Chlortetracycline*

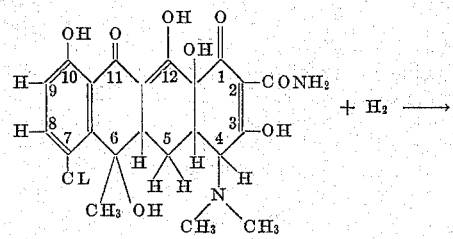

*Tetracycline*

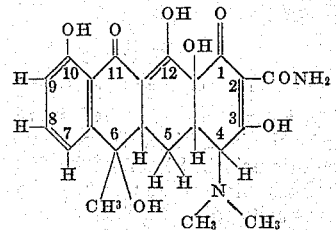

This reaction is usually carried out in an inert solvent for chlortetracycline such as one of the lower aliphatic alcohols, glycol ethers and the like. Solvents such as beta-ethoxyethanol, beta-methoxyethanol, n-butanol, methanol, ethanol and mixtures thereof have been used. The reaction is preferably carried out at temperatures between about 15° C. and 40° C., although lower temperatures down to about 0° C. may be used to obtain a minimum of decomposition and higher temperatures up to about 90°–100° C. may sometimes be employed in the interest of higher reaction speeds. Relatively low hydrogen pressures on the order of 15–60 lbs. per square inch absolute are usually employed.

Noble metal catalysts have heretofore been considered the most suitable for this reaction, and catalysts consisting of about 5–10% of finely divided metallic palladium or platinum distributed on activated charcoal are used commercially. These catalysts, while effective, possess a number of disadvantages; they are pyrophoric in the presence of flammable mixtures of air and solvent or hydrogen and therefore present a considerable fire hazard and they tend to become very sluggish during the later stages of the hydrogenolysis reaction. It is a principal object of our present invention to provide a class of catalysts for the above-described reaction which are more highly active, produce improved yields of the desired tetracycline reaction product, and which are not pyrophoric and can therefore be handled and stored safely.

In accordance with our invention the above objects are attained by reacting hydrogen with chlortetracycline in the presence of a palladium hydroxide-type catalyst which as prepared may consist of finely divided palladium hydroxide alone or may contain palladium hydroxide distributed on a porous and preferably finely divided carrier. We have found that the use of catalysts of this type will result in improved yields of tetracycline in considerably shorter reaction times than are required when metallic platinum or palladium catalysts are present at the start of the reaction; the extent of this improvement will be shown in the specific examples which follow.

It is an advantage of our invention that the reaction conditions heretofore used with metallic platinum and palladium catalysts can also be employed with our new palladium hydroxide type catalysts, so that no essential change need be made in the manufacturing processes described above except the substitution of our novel class of catalytic materials. The hydrogenolysis reaction is preferably carried out by suspending a finely divided palladium hydroxide catalyst, either in the form of palladium hydroxide alone or distributed on a porous or finely divided carrier, in a solution of chlortetracycline in an organic solvent therefor and reacting hydrogen with the resulting dispersion. The hydrogenolysis is preferably carried out at temperatures of about 20°–40° C., although any other desired temperatures may be used as indicated above. The quantity of catalyst can be varied through any desired range depending somewhat on the speed of reaction desired, but for most purposes about 5% to 20% of a catalyst consisting of 5 to 15 parts by weight of palladium hydroxide (Pd(OH)$_2$) distributed on 95 to 85 parts of activated carbon or other porous carrier, these percentages being based on the weight of the chlortetracycline, is preferred. The preferred amounts of palladium hydroxide are therefore about 0.25% to 3% of the weight of the chlortetracycline.

When palladium hydroxide alone is used as the catalyst it is preferably prepared by precipitation from a water solution of palladium chloride by adding a water-soluble base such as sodium hydroxide, potassium hydroxide, ammonium hydroxide and the like in quantities sufficient to raise the pH of the slurry to about 9–10. The resulting finely divided precipitate of palladous hydroxide is recovered by settling and decanting or by centrifuging and may be added directly to the chlortetracycline solution to be hydrogented. Supported catalysts are preferably prepared by carrying out the same precipitation reaction in the presence of a porous or finely divided carrier such as activated carbon, activated alumina, diatomaceous earth and the like. The resulting impregnated or coated carrier is separated by filtration and may be dried by low-temperature drying procedures that do not dehydrate the palladous hydroxide or may be used in its original wet condition.

The hydrogenolysis of chlortetracycline to tetracyline in the presence of our new catalysts may be carried out as a batch process or a continuous hydrogenation procedure may be used. When the hydrogenolysis is carried out batch-wise the finely divided palladium hydroxide-type catalyst is suspended in a solution of chlortetracycline in a solvent therefor, such as one of the inert solvents mentioned above, in an autoclave or other pressure vessel and hydrogen gas is introduced. The initial reaction between the hydrogen and the chlortetracycline is quite rapid in the presence of the palladium hydroxide catalyst, but it becomes much slower as the process is continued. This reduction in speed is probably due primarily to the consumption of chlortetracycline and hydrogen with the production of increasing amounts of tetracycline, although a partial or even complete reduction of the catalyst may also be a contributing cause. In any event, however, experience has shown that while the first half of the chlortetracycline is reduced in only a few minutes, a much greater time is required for the reaction to go to completion. For this reason the process is frequently terminated when the reaction is about 90% complete. Comparative tests have shown, however, that 90% completion of the reaction is attained when the palladium hydroxide catalysts of our invention are initially present in approximately one-fifth of the time that is required when a previously-reduced or metallic type palladium catalyst is used at the start.

When a continuous hydrogenation process is used a suspension of the palladium hydroxide-type catalyst in a solution of chlortetracycline in an organic solvent therefor is passed through one or more reaction tubes while hydrogen under pressure is introduced therein. The length of the reaction tube and the speed of passage is preferably adjusted so that the reaction is about 90% complete when the passage through the tube is completed. Preferably an acid acceptor such as triethylamine or other organic base is present in the reaction mixture in a quantity sufficient to combine with all of the hydrochloric acid liberated by the hydrogenolysis so that the tetracycline is produced and recovered as the free base.

While our new palladium hydroxide catalysts can be used in carrying out the hydrogenolysis at any pH at which chlortetracycline is comparatively stable, the reaction is usually performed at a neutral or alkaline pH, both because chlortetracycline is more reactive with hydrogen than its salts and because the tetracycline reaction product is more easily recovered in higher yields under neutral and alkaline conditions. It will be understood, therefore, that while the process of our invention is not limited to any particular conditions of acidity or alkalinity, insofar as the hydrogenolysis reaction is concerned, the use of our improved catalysts under neutral or alkaline conditions up to a pH of about 9.5–9 is preferred.

The invention will be illustrated by the following specific examples. It will be understood, however, that although these examples may describe some of the more specific features of the invention they are given primarily for purposes of illustration, the scope of the invention being defined by the appended claims.

*Example 1*

A solution of palladium chloride was prepared by suspending 0.83 gram of palladium chloride in 83 ml. of water containing 2.08 ml. of concentrated hydrochloric acid and agitating until complete solution was obtained. To this solution 10.0 grams of finely divided activated carbon (Darco G60) and 6.1 ml. of 5 normal sodium hydroxide solution was added. The pH of the resulting slurry was 9.78. This slurry was agitated mechanically for 40 minutes, filtered, and the wet filter cake was dried in vacuo overnight without heat. It was further dried at 40° C. for an additional 8 hours.

To a solution containing 10 grams of twice recrystallized chlortetracycline hydrochloride in a mixture of 19 ml. of ethyl ether of ethylene glycol (Cellosolve), 19 ml. of butanol and 2.2 ml. of water there was added 1.5 grams of the above described catalyst containing the equivalent of 5% of palladium on charcoal. To this mixture was added 6.8 ml. (2.5 equivalents) of triethylamine. The resulting mixture was poured into a 250 ml. pressure bottle and reduced at room temperature with hydrogen on a Parr shaker, the pressure of hydrogen at the start of the reaction being 45 p. s. i. g.

The activity of the palladium hydroxide-type catalyst is shown by the fact that 50% of the chlortetracycline was reduced in 4 minutes, 90% was reduced in 16 minutes, and the material was 100% reduced in 40 minutes. The catalyst was removed by filtration and an equal volume of butanol was added to the filtered reduced solution. Concentrated hydrochloric acid was then added to a pH of 1.74 and the solution was seeded with active seed and aged on a rotary shaker for 44 hours. The tetracycline crystals were then filtered off, washed twice with 10 ml. of isobutanol and dried in vacuo at 40° C. for 4 hours. The yield was 86.8% of theory.

The product was assayed by comparison with a standard solution of tetracycline of known therapeutic activity by a standard spectro-photometric procedure (SP–108) and was rated as 100.5%. Its purity was determined by measuring the extinction coefficient with a spectrophotometer at 450 millimicrons on an 0.5% solution of the hydrochloride; the measured value (0.213) was well within the present specification of 0.400 for a commercially acceptable product.

*Example 2*

Another sample of palladium hydroxide on charcoal was prepared using the same quantities and procedure described in Example 1, but omitting the drying step. Because a wet catalyst was added to the chlortetracycline solution, the 2.2 ml. of water was omitted. The undried catalyst was found to possess an activity about equal to that of the dried catalyst; 50% of the chlortetracycline was reduced in 5 minutes, 90% was reduced in 17 minutes, and the reduction was complete in 40 minutes. The yield was 87.7% of theory, the assay was 100.5% and the extinction coefficient was 0.195.

*Example 3*

An unsupported palladium hydroxide catalyst was prepared by dissolving 83 mg. of palladium chloride in water and adjusting the pH to 9.7 by the addition of 27 ml. of 0.14-N sodium hydroxide solution. A brown precipitate of finely divided palladium hydroxide was formed. The slurry was centrifuged and the supernatant solution was decanted, after which the precipitate was used for the reduction of 10 grams of chlortetracycline by the procedure described in Example 1. The yield, assay and purity of the product were comparable to the results of Example 2.

*Example 4*

A portion of finely divided diatomaceous earth (Hyflo) weighing 10 grams was stirred into a solution of 0.83 gram of palladium chloride and 2 ml. of concentrated hydrochloric acid in 83 ml. of water and 6.1 ml. of 5 N. sodium hydroxide solution was added. The resulting slurry was agitated 40 minutes to complete the adsorption of palladium hydroxide on the porous silica after which it was filtered and dried in a vacuum without heat.

The resulting catalyst was added to a solution of 10 grams of tetracycline hydrochloride in the mixture of solvents described in Example 1 which was then reacted with hydrogen under the conditions described in that example. The yield of tetracycline was 87.2% of theory and the product was of acceptable purity and activity.

*Example 5*

The procedure of Example 4 was repeated but 10 grams of finely divided alumina gel was substituted for the diatomaceous earth. When used under the reaction conditions described in Example 1 the catalyst was found to have an activity equal to the silica-supported catalyst of the preceding example.

*Example 6*

For purposes of comparison, the following example is given of the results obtained with a commercially available catalyst consisting of 5% palladium metal on charcoal (Baker's Reduced, Lot No. 1912). A solution of 10 grams of twice recrystallized chlortetracycline hydrochloride in 19 ml. of ethyl ether of ethylene glycol (Cellosolve), 19 ml. of butanol and 2.2 ml. of water was prepared and 1.4 grams of the catalyst was added. To this mixture there was added 6.8 ml. (2.5 equivalents) of triethylamine and the mixture was poured into a 250 ml. pressure bottle and reduced at room temperature with hydrogen under an initial pressure of 45 p. s. i. g. on the Parr shaker. 50% of the chlortetracycline was reduced in 6 minutes, 90% was reduced in 60 minutes, and 210 minutes were required to obtain a complete reduction. The catalyst was removed by filtration, an equal volume of butanol was added, the solution was acidified to pH 1.72 with concentrated hydrochloric acid, seeded with active seed and aged on a rotary shaker for 48 hours. The crystals of tetracycline were then filtered off, washed twice with 10 ml. of isopropanol and dried in vacuo at 40° C. for 4 hours. The yield was 83.8% of theory, the assay was 100.0% and the extinction coefficient was 0.167.

What we claim is:

1. A method according to claim 6 in which the carrier is activated carbon.

2. A method according to claim 6 in which the carrier is activated alumina.

3. A method according to claim 6 in which the carrier is a diatomaceous earth.

4. A method for the hydrogenolysis of chlortetracycline to tetracycline which comprises reducing with hydrogen at a temperature in the range of 0° C. to 100° C. a solution of chlortetracycline in a solvent therefor and having a finely divided palladium hydroxide catalyst suspended therein and recovering the tetracycline so produced.

5. A method for the hydrogenolysis of chlortetracycline to tetracycline which comprises reducing with hydrogen at a temperature in the range of 0° C. to 100° C. a solution of chlortetracycline in a solvent therefor and having suspended therein a finely divided catalyst containing about 0.25% to 3% on the weight of said chlortetracycline of palladium hydroxide and recovering the tetracycline so produced.

6. A method for the hydrogenolysis of chlortetracycline to tetracycline which comprises reducing with hydrogen at a temperature in the range of 0° C. to 100° C. a solution of chlortetracycline in a solvent therefor and having suspended therein about 5% to 20% on the weight of said chlortetracycline of a catalyst comprising palladium hydroxide distributed on a finely divided porous carrier.

References Cited in the file of this patent

UNITED STATES PATENTS

| | | |
|---|---|---|
| 1,222,660 | Paal | Apr. 17, 1917 |
| 2,285,277 | Henke et al. | June 2, 1942 |
| 2,475,155 | Rosenblatt | July 5, 1949 |

OTHER REFERENCES

Boothe et al.: "J. Am. Chem. Soc.," vol. 75, Sept. 20, 1953, p. 4621

Conover et al: "J. Am. Chem. Soc.," vol. 75, Sept. 20, 1953, pp. 4622–3.

Stephens et al.: "J. Am. Chem. Soc.," vol. 76, July 5, 1954, p. 3573.